(12) United States Patent
Almarhoon et al.

(10) Patent No.: US 12,189,074 B2
(45) Date of Patent: Jan. 7, 2025

(54) EVENT CONTINUITY MAPPING USING SEISMIC FREQUENCY ANALYSIS

(71) Applicant: SAUDI ARABIAN OIL COMPANY, Dhahran (SA)

(72) Inventors: Maher I. Almarhoon, Al Qatif (SA); Wisam AlKawai, Qatif (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 66 days.

(21) Appl. No.: 17/643,647

(22) Filed: Dec. 10, 2021

(65) Prior Publication Data

US 2023/0184980 A1 Jun. 15, 2023

(51) Int. Cl.
G01V 1/50 (2006.01)

(52) U.S. Cl.
CPC ............ G01V 1/50 (2013.01); *G01V 2210/48* (2013.01); *G01V 2210/63* (2013.01)

(58) Field of Classification Search
CPC ... G01V 1/50; G01V 2210/48; G01V 2210/63
See application file for complete search history.

(56) References Cited

U.S. PATENT DOCUMENTS

| 4,380,059 A | 4/1983 | Ruehle |
| 4,425,798 A * | 1/1984 | Nagai ............... G01H 1/003 73/659 |
| 5,051,960 A | 9/1991 | Evin |
| 6,094,620 A | 7/2000 | Gasparotto et al. |
| 8,082,106 B2 | 12/2011 | Matson et al. |
| 8,121,791 B2 | 2/2012 | Lazaratos et al. |
| 8,447,524 B2 | 5/2013 | Chen et al. |
| 8,649,980 B2 | 2/2014 | Gulati |
| 9,366,775 B2 | 6/2016 | Hung et al. |
| 10,295,688 B2 | 5/2019 | Ramirez-Perez et al. |
| 10,379,245 B2 | 8/2019 | Pan |

(Continued)

FOREIGN PATENT DOCUMENTS

| CA | 2359579 C | * | 4/2013 | ............ G01V 1/301 |
| CN | 103424777 B | * | 6/2016 | |

(Continued)

OTHER PUBLICATIONS

K. Cichostępski and et al., "Verification of bright spots in the presence of thin beds by AVO and spectral analysis in Miocene sediments of Carpathian Foredeep", Acta Geophysica (2019) 67:1731-1745 (Year: 2019).*

(Continued)

*Primary Examiner* — Douglas Kay
(74) *Attorney, Agent, or Firm* — Osha Bergman Watanabe & Burton LLP

(57) ABSTRACT

Methods and systems for identifying a multiple artifact are disclosed. The method includes obtaining a post-stacked seismic image of a subterranean region and identifying a horizon with the post-stacked seismic image. The method further includes determining a spectral section over the horizon by applying spectral decomposition to the post-stacked seismic image. The method still further includes detecting a frequency anomaly within the spectral section by comparing the spectral section to a reference spectral section and identifying the multiple artifact based on the frequency anomaly.

12 Claims, 7 Drawing Sheets

(56) References Cited

U.S. PATENT DOCUMENTS

| | | | |
|---|---|---|---|
| 11,320,557 B2* | 5/2022 | Sun | G01V 1/28 |
| 2017/0299745 A1 | 10/2017 | Kim et al. | |
| 2019/0219719 A1 | 7/2019 | Paramo et al. | |
| 2020/0233113 A1* | 7/2020 | Luo | G01V 1/42 |
| 2020/0263529 A1* | 8/2020 | Ahmed | E21B 41/00 |
| 2020/0271809 A1* | 8/2020 | Al-Ali | G01V 1/50 |
| 2021/0011186 A1 | 1/2021 | Cambois | |
| 2021/0103065 A1 | 4/2021 | Whitmore, Jr. et al. | |
| 2021/0215824 A1 | 7/2021 | Bai et al. | |
| 2021/0302611 A1* | 9/2021 | Sun | G01V 1/28 |
| 2022/0260740 A1* | 8/2022 | Bakulin | G01V 1/30 |
| 2022/0260742 A1* | 8/2022 | Bakulin | G01V 1/364 |
| 2022/0268957 A1* | 8/2022 | Bakulin | G01V 1/36 |

FOREIGN PATENT DOCUMENTS

| | | | |
|---|---|---|---|
| CN | 106094028 A | 11/2016 | |
| WO | 2014/150897 A2 | 9/2014 | |
| WO | WO-2021202239 A1 * | 10/2021 | G01V 1/005 |

OTHER PUBLICATIONS

Olaleye, O. K. and et al. "Use of spectral decomposition technique for mapping geologic features of 'Reigh'field, Onshore Niger Delta." Nigeria Journal of Pure and Applied Physics 10, No. 1 (2020): 1-7 (Year: 2020).*

Stark, T. "Visualization techniques for enhancing stratigraphic inferences from 3D seismic data volumes." First Break 24, No. 4 (2006) (Year: 2006).*

Butorin, A. V., and F. V. Krasnov. "Approaches to the analysis of spectral decomposition for the purpose of detailed geological interpretation." In SPE Russian Petroleum Technology Conference?, pp. SPE-182079. SPE, 2016 (Year: 2016).*

Rajesh, R et al., "De-noising of 3d Seismic Data Using Multichannel Singular Spectrum Based Time Slice and Horizon Processing," SEG Technical Program Expanded Abstracts 2015: 4708-4713, Aug. 19, 2015, 6 pages.

* cited by examiner

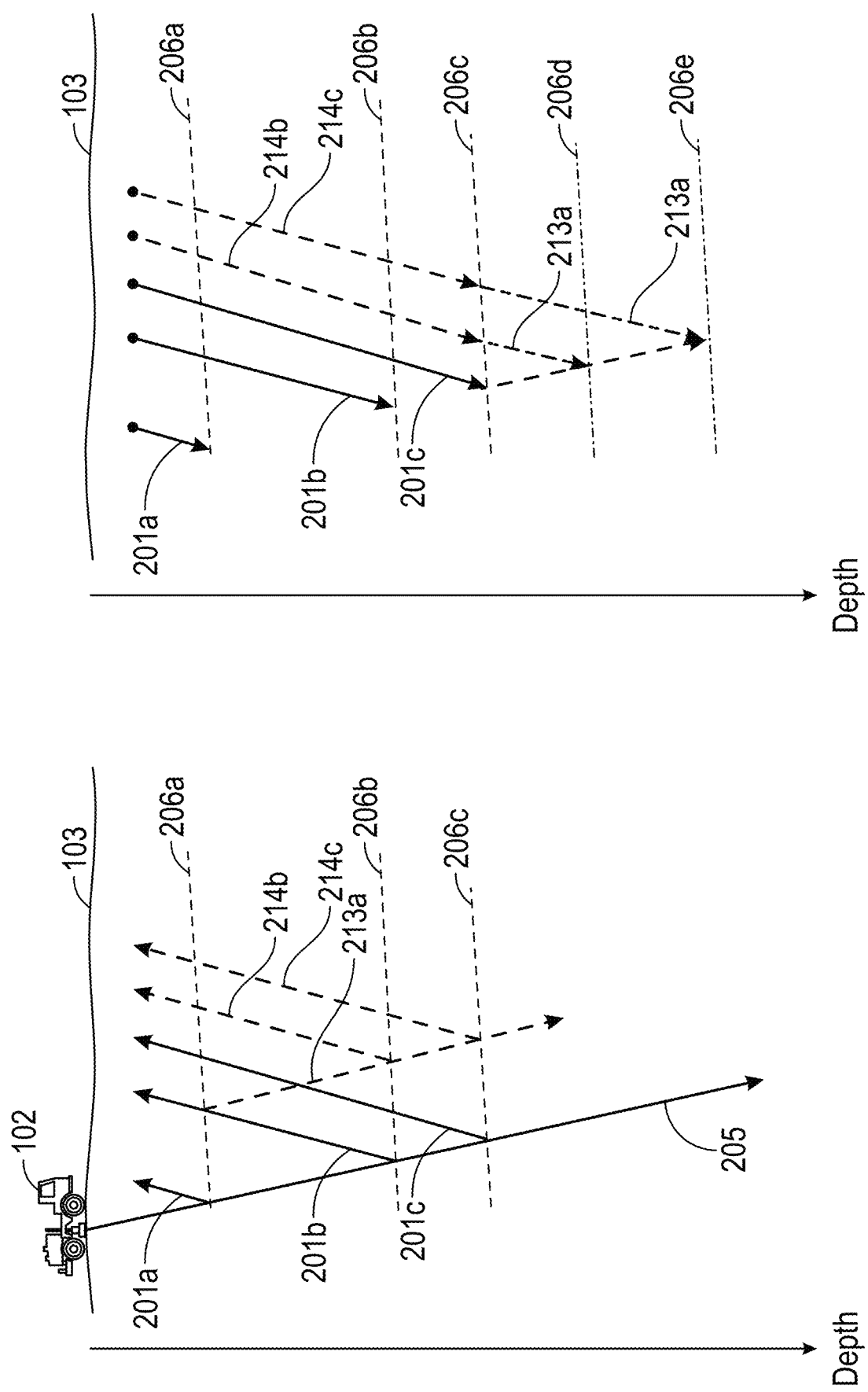

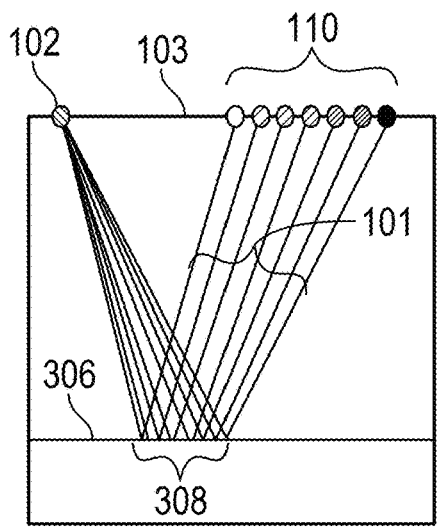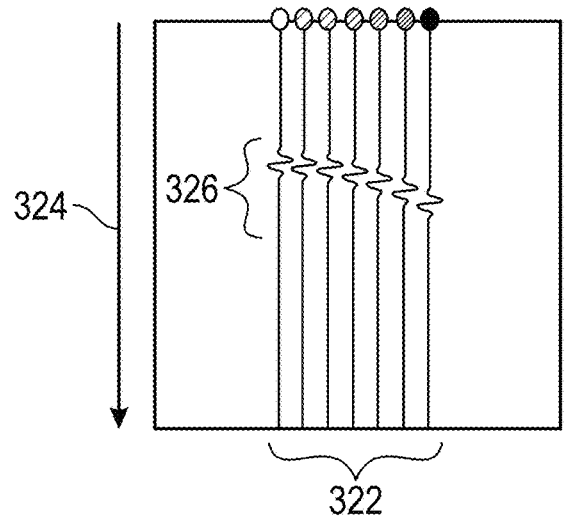
FIG. 3A  FIG. 3B
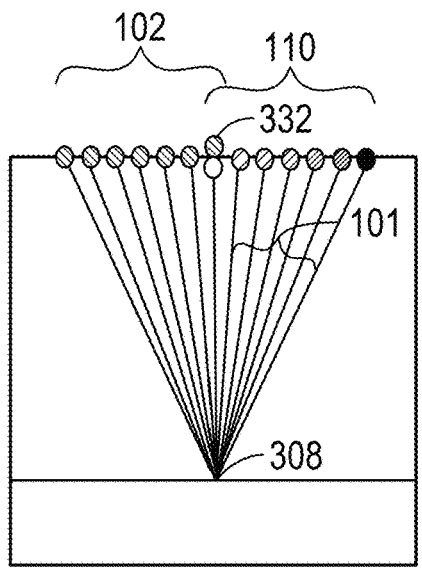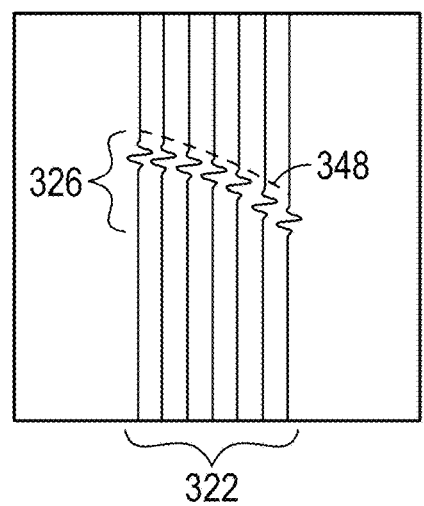
FIG. 3C  FIG. 3D
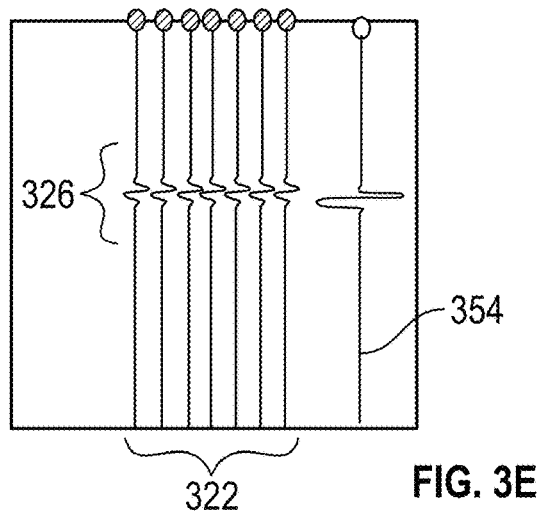
FIG. 3E

EVENT CONTINUITY MAPPING USING SEISMIC FREQUENCY ANALYSIS

BACKGROUND

In the oil and gas industry, seismic surveys may be used to image the subsurface in search of oil and gas reservoirs. Typically, the seismic data acquired by seismic surveys must be processed prior to forming an image of the subsurface. Seismic processing frequently assumes seismic data is composed of seismic waves that have propagated down into the subsurface from the surface of the Earth, have reflected once from a boundary, and have propagated back to the surface of the Earth where they are detected and recorded. Seismic waves that have reflected once from a seismic reflector are called "primary signals" or simply "primaries".

However, in addition to primaries, seismic data frequently includes seismic waves that have reflected multiple times. In particular, seismic data may include seismic waves that have reflected upward from a first seismic reflector, then reflected downward from a second seismic reflector at a shallower depth than the first seismic reflector, and then reflected upward from a third seismic reflector at a deeper depth than the second seismic reflector. Signals of this type are called "multiple signals", "multiple-artifacts" or simply "multiples". When multiples are processed under the erroneous assumption that they are primaries, fictious reflectors may appear in the resulting seismic image and real seismic reflectors may be masked or blurred. Further, fictious reflectors may be interpreted as real and cause the presence or location of a hydrocarbon reservoir to be misidentified.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of identifying a multiple-artifact. The method includes obtaining a post-stacked seismic image of a subterranean region and identifying a horizon with the post-stacked seismic image. The method further includes determining a spectral section over the horizon by applying spectral decomposition to the post-stacked seismic image. The method still further includes detecting a frequency anomaly within the spectral section by comparing the spectral section to a reference spectral section and identifying the multiple-artifact based on the frequency anomaly.

In general, in one aspect, embodiments relate to a non-transitory computer readable medium storing instructions executable by a computer processor. The instructions include functionality for receiving a post-stacked seismic image of a subterranean region and identifying a horizon within the post-stacked seismic image. The instructions further include determining a spectral section over the horizon by applying spectral decomposition to the post-stacked seismic image. The instructions still further include detecting a frequency anomaly within the spectral section by comparing the spectral section to a reference spectral section and identifying a multiple-artifact based on the frequency anomaly.

In general, in one aspect, embodiments relate to a system including a seismic acquisition system and a computer system configured to receive a post-stacked seismic image of a subterranean region from the seismic acquisition system. The computer system is further configured to identify a horizon with the post-stacked seismic image and determine a spectral section over the horizon by applying spectral decomposition to the post-stacked seismic image. The computer system is still further configured to detect a frequency anomaly within the spectral section by comparing the spectral section to a reference spectral section and identify a multiple-artifact based on the frequency anomaly.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 2A and 2B depict multiples in accordance with one or more embodiments.

FIGS. 3A through 3E show seismic processing in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a multiple" includes reference to one or more of such multiples.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Figure 1:
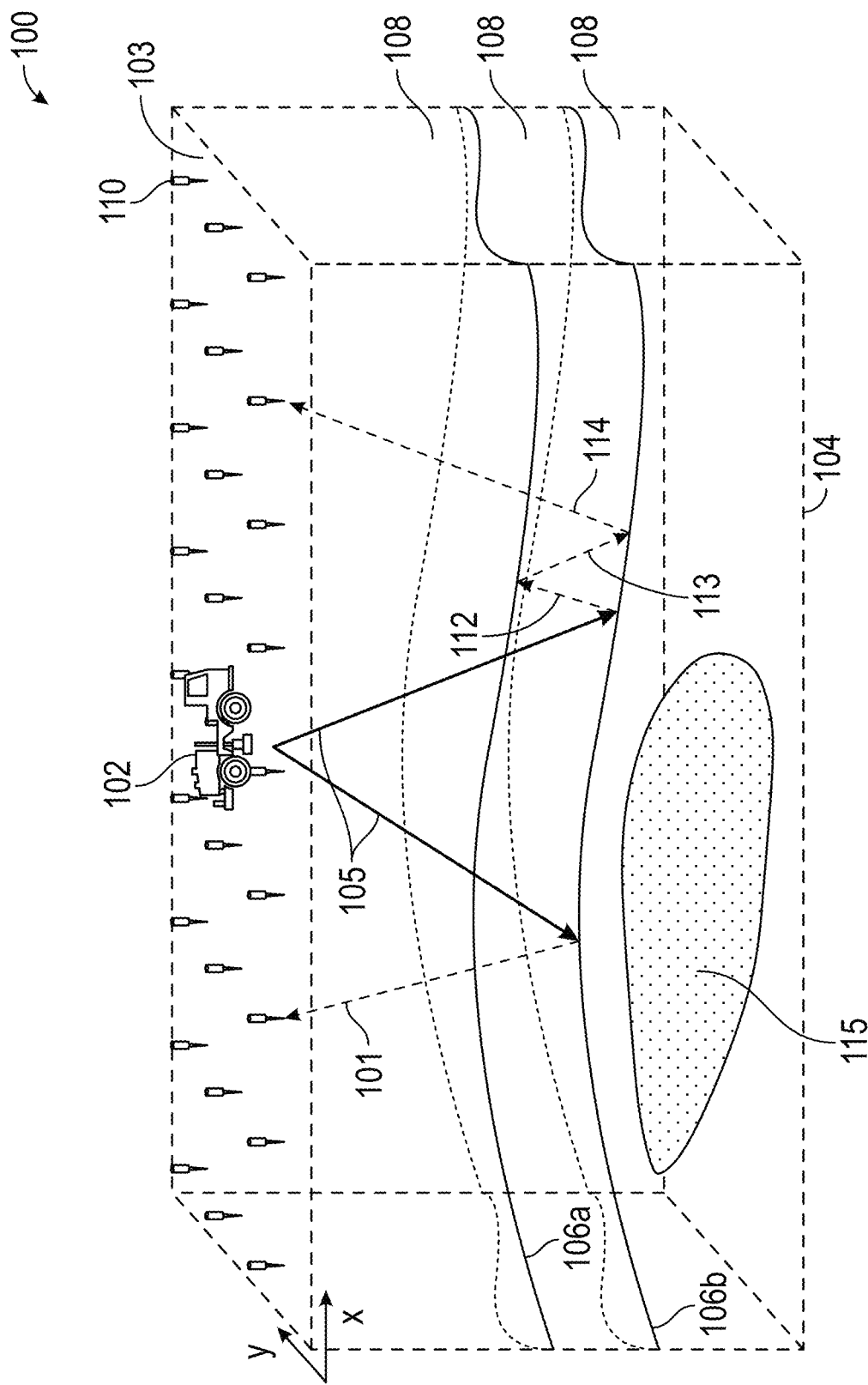
FIG. 1 depicts a seismic survey in accordance with one or more embodiments.

FIG. 1 depicts a seismic acquisition system acquiring a seismic survey (100) in accordance with one or more embodiments. During a seismic survey (100), a radiated seismic wave (105) may be emitted from a source (102) into a subterranean region (104) below the surface of the Earth (103). The radiated seismic wave (105) may partially reflect when it encounters a boundary (106b) between rock layers (108). The partially reflected seismic wave (101) may propagate to the surface of the Earth (103) where the amplitude of ground vibration caused by the partially reflected seismic wave (101) may be detected by receivers (110) and recorded. This type of partially reflected seismic wave (101) with only one reflection is commonly called a "primary". Primaries (101) generated at a plurality of sources (102) each detected by a plurality of receivers (110) may be processed to generate a three-dimensional ("3D") image of the subterranean region (104). The 3D image may show boundaries (106a, 106b) that may delineate a hydrocarbon reservoir (115).

However, some partially reflected seismic waves (112) generated by a boundary (106b) may be further partially reflected downward (113) by an overlying boundary (106a) and further partially reflected upwards (114) to be detected by a receiver (110) at the surface of the Earth (103). This type of multiply reflected seismic wave may be referred to as a "multiple".

FIG. 2A shows a schematic representation of one seismic wave (205) that generates both primaries (201a-c) and multiples (214b-c). The downward-propagating seismic wave (205) may cross several boundaries (206a-c) that reflect the downward-propagating seismic wave (205). At each boundary (206a-c), the downward-propagating seismic wave (205) may generate a primary (201a-c), where each primary (201a-c) contains a portion of the energy from the downward-propagating seismic wave (205). However, some upward-propagating primaries (201b) may also cross boundaries (206a). When the upward-propagating primary 201b crosses the boundary 206a, the downward-propagating seismic wave 213a may be generated. Furthermore, this downward-propagating seismic wave (213a) may be further reflected at other boundaries (206b, 206c) to generate upward-propagating seismic waves (214b, 214c). These upward-propagating seismic waves (214b, 214c) have now reflected multiple times before reaching a receiver (110) to generate a multiple. For illustration, FIG. 2A only depicts three boundaries (206a-c), however, in reality, the seismic wave 205 may encounter many more boundaries each potentially generating a primary and many more multiples.

FIG. 2B depicts the erroneous results that arise when a seismic processing workflow erroneously assumes that only primaries (201a-c) have been recorded by receivers (110), whereas, in reality, both primaries (201a-c) and multiples (214b-c) have been detected. To preface, primary 201a generates an image of boundary 206a, primary 201b generates an image of boundary 206b, and primary 201c generates an image of boundary 206c. Continuing, multiples 214b and 214c erroneously generate images of phantom boundaries 206d and 206e due to the new downward propagating seismic wave 213a.

Phantom boundaries (206d, 206e) may be misinterpreted as real boundaries, may obscure real boundaries, or both within the seismic image. It is particularly problematic if phantom boundaries (206d, 206e) manifest near or around hydrocarbon reservoirs (115) in the seismic image. When this occurs, seismic interpreters may falsely interpret hydrocarbon reservoir continuity when the hydrocarbon reservoir (115) has terminated. Alternatively, when this occurs, seismic interpreters may falsely interpret regions of the hydrocarbon reservoir (115) to be prolific when they are not. Incorrect interpretations of the seismic image may ultimately lead to drilling less prolific areas of the hydrocarbon reservoir (115) or drilling completely outside the hydrocarbon reservoir (115).

Considerable effort has been put into removing multiple (214b-c) from seismic images during seismic processing, which may be performed by a number of methods known to a person of ordinary still in the art without departing from the scope of the invention. Seismic processing, for example, aims to correct for artifacts near the source (102) and receivers (110), correct for differences in source-receiver spacing, attenuate noise, and remove multiples (214b-c) to have a clear and preserved image of primaries (201a-c). Examples of seismic processing to remove multiples (214b-c) may include correlation and convolution techniques as well as frequency filters. However, removing all multiples (214b-c) from a seismic image remains a challenge as multiples (214b-c), especially short-path multiples, can be difficult to distinguish from primaries as arrival times may be similar. Those skilled in the art will appreciate that the term "multiples" and "multiple artifacts" may be used interchangeably and hereinafter are depicted using the same reference number.

FIG. 3A through FIG. 3E depict various stages of seismic processing where only primaries (101) are shown. FIG. 3A depicts one arrangement of primaries (101) where seismic waves radiate from one source (102), reflect at a boundary (306) at various horizontal reflection points (308), propagate back to the surface of the Earth (103), and are recorded by receivers (110).

FIG. 3B depicts the resulting traces (322) or time-series recorded by the receivers (110) from FIG. 3A. Each wavelet (326) represents when each seismic wave reflected at a boundary (306). Traces (322) originating from one source (102) may be called a "source gather" or "shot gather". The horizontal offset of the receivers (110) relative to the source (102) create wavelets (326) in traces (322) at varying two-way travel times as indicated by the vertical axis (324). This phenomenon is often called "moveout".

FIG. 3C depicts an alternative arrangement of primaries (101) relative to FIG. 3A. In FIG. 3C, sources (102) and receivers (110) are arranged to have a common mid-point (332) and may be called a "common mid-point gather". In many cases, a common mid-point gather may be more convenient than a shot gather because the horizon reflection points (308) of the primaries (101) occur at the same point for all primaries (101).

FIG. 3D depicts the resulting traces (322) using a common mid-point gather from FIG. 3C. The wavelets (326) in a common mid-point gather also exhibit increasing two-way travel times similar to the shot gather. The two-way travel times of wavelets (326) may be said to form a pre-stack horizon (348).

FIG. 3E shows a pre-stack common mid-point gather after correction for two-way travel time moveout of FIG. 3D. After correction for two-way travel time moveout, all traces (322) from one boundary (306) arrive at the same time and the corrected traces (322) may be summed or stacked to form a post-stacked trace (354). The post-stack trace (354) may have a higher signal-to-noise ratio than traces (322) in the common mid-point gather due to the increased wavelet amplitude.

Figure 4:
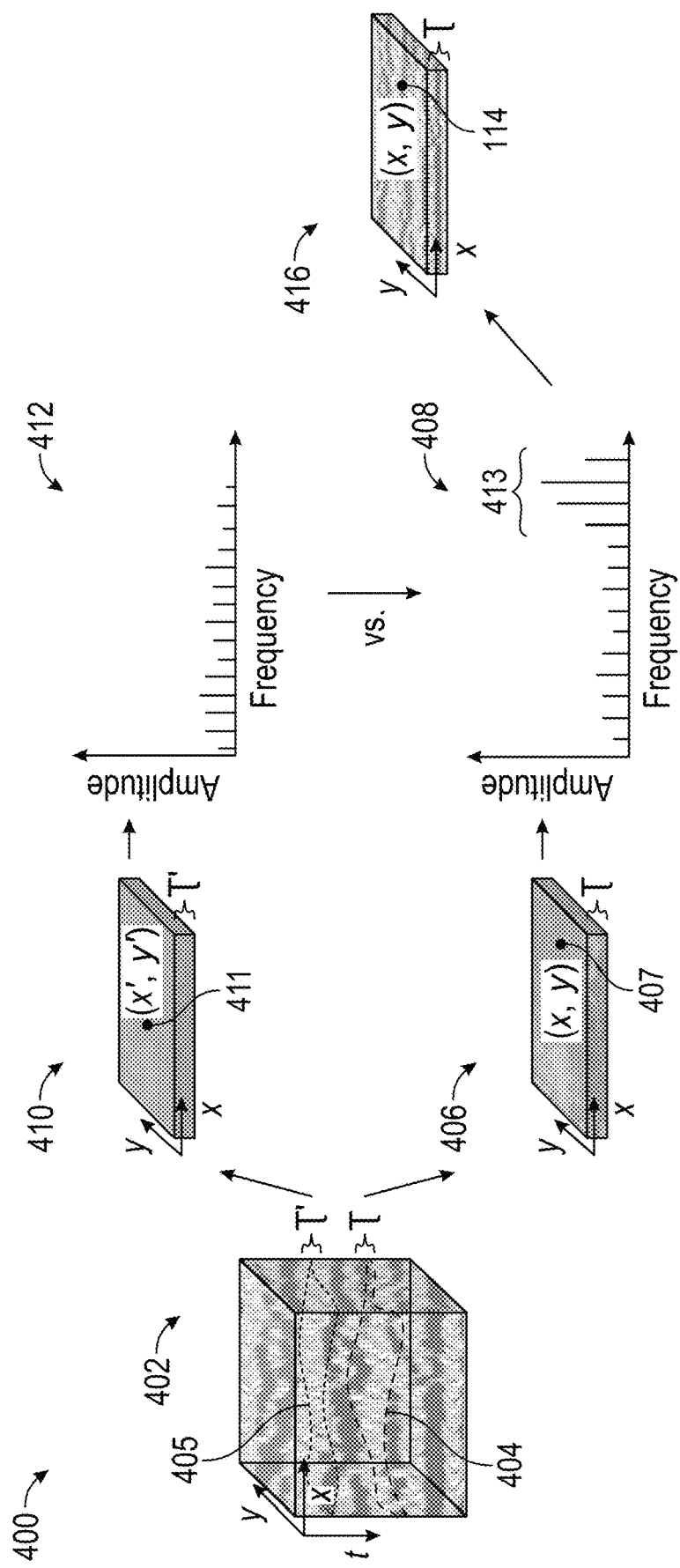
FIG. 4 shows a workflow in accordance with one or more embodiments.

FIG. 4 shows a workflow (400) for identifying multiple-artifacts (114) in a post-stacked seismic image (402) following seismic processing in accordance with one or more embodiments. A horizon (404) is identified on a post-stacked seismic image (402). The horizon (404) may follow a large or bright amplitude within the post-stacked seismic image (402) to transect the post-stacked seismic image (402). A person or ordinary skill in the art will appreciate that a large amplitude is commonly referred to as a "bright amplitude" based on how the large amplitude visually manifests in a post-stacked seismic image (402). From hereinafter, the term "bright amplitude" will also be used to denote a large amplitude. In this embodiment, a time-window, $\tau$, represents a post-stacked seismic section (416) centered along the horizon (404). The horizon (404) and the time-window, $\tau$, may or may not be flat. In other embodiments, if the post-stacked seismic image were in the depth domain, $\tau$ may represent a depth-window. Similarly, a reference horizon (405) is identified on the post-stacked seismic image (402). The reference horizon (405) may follow a bright amplitude within the post-stacked seismic image (402) and may physically represent a known continuous boundary (306). In this embodiment, a reference time-window, $\tau'$, represents a post-stacked seismic section centered along the reference horizon (405).

Spectral decomposition is applied to the post-stacked seismic image (402) over the time-window, $\tau$, centered at the horizon (404) and over the reference time-window, $\tau'$, centered at the reference horizon (405) to determine a spectral section (406) and a reference spectral section (410). Spectral decomposition may be performed by a number of methods known to a person of ordinary still in the art without departing from the scope of the invention, such as by using a short-time Fourier transform. The spectral section (406) and the reference spectral section (410) may be thought of as four-dimensional in that frequency content and amplitude content exist at each location along the x-y plane within each time-window, $\tau$ and $\tau'$.

The frequency content and amplitude content of the spectral section (406) are then compared to the reference frequency content and reference amplitude content of the reference spectral section (410). Due to the plurality of frequencies and amplitudes at each location within the spectral section (406) and the reference spectral section (410), it may be easier to compare the frequency content and amplitude content at a single location (x, y) (407) within the spectral section (406) to the reference frequency content and reference amplitude content at a single location (x', y') (411) within the reference spectral section (410). Accordingly, the frequency content and amplitude content may then be viewed two-dimensionally in the form of a frequency-amplitude plot (408) and a reference frequency-amplitude plot (412). A comparison may be performed by comparing an amplitude in the frequency-amplitude plot (408) to a reference amplitude in the reference frequency-amplitude plot (412) for each frequency. If amplitudes of frequencies in the frequency-amplitude plot (408) are larger or brighter than reference amplitudes of reference frequencies in the reference frequency-amplitude plot (412) for particular frequencies, those frequencies may be frequency anomalies (413) in one embodiment. In other embodiments, if an amplitude of a frequency in the frequency-amplitude plot (408) is a given number of times larger or brighter than a reference amplitude of a frequency in the reference frequency-amplitude plot (412), the frequency may be a frequency anomaly (413).

Once frequency anomalies (413) are detected within the spectral section (406), the location (x, y) (407) of the frequency anomalies (413) within the post-stacked seismic section (416) may be identified as a multiple artifact (114).

Figure 5:
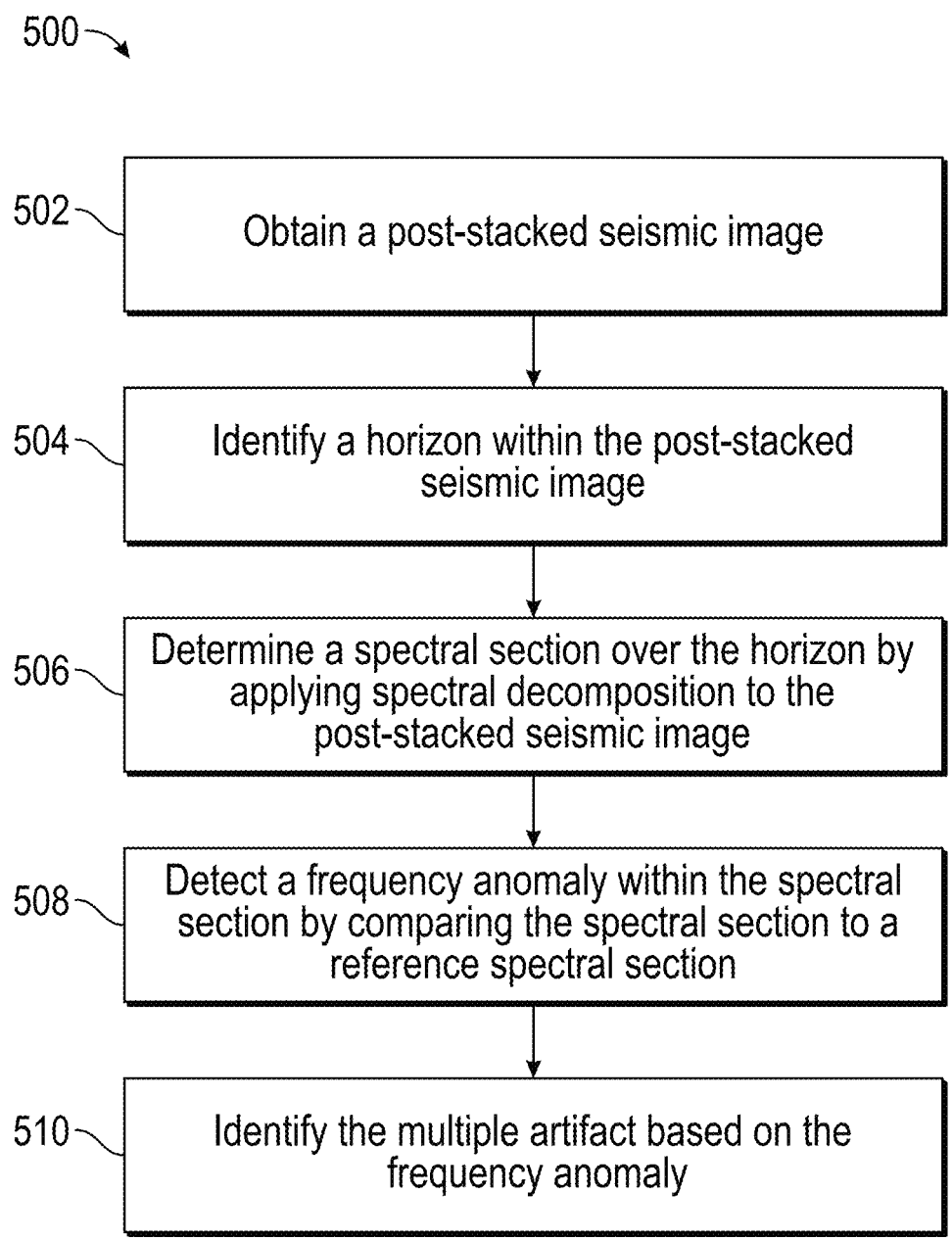
FIG. 5 shows a flowchart in accordance with one or more embodiments.

FIG. 5 shows a flowchart (500) for identifying multiple-artifacts (114) in a post-stacked seismic image (402). In step 502, a post-stacked seismic image (402) is obtained that has previously been processed. Seismic processing may be performed by a number of methods known to a person of ordinary still in the art without departing from the scope of the invention. Seismic processing may be used to enhance, migrate, and/or attenuate trace information. For example, traces of redundant information may be summed together or stacked to enhance the post-stacked seismic image (402) and attenuate noise. Further, traces may be migrated due to normal moveout and dip moveout. Finally, a subset of multiple-artifacts (114) may be attenuated using correlation, convolution, and/or filtering techniques.

In step 504, a horizon (404) is identified within the post-stacked seismic image (402). The horizon (404) may transect the post-stacked seismic image (402) and may not be flat. A portion of the horizon (404) or the entire horizon (404) may physically represent a boundary (306) between rock layers (108) or a multiple artifact (114) that seismic processing failed to attenuate or remove. The horizon (404) may manifest as a bright amplitude within the post-stacked seismic image (402). A time-window, $\tau$, centered at the horizon (404) is then defined.

In step 506, spectral decomposition is applied to the post-stacked seismic image (402) over the time-window, $\tau$, centered at the horizon (404) to determine a spectral section (406). Spectral decomposition may be performed by a number of methods known to a person of ordinary still in the art without departing from the scope of the invention. For example, spectral decomposition may be performed using a discrete Fourier transform, a short-time Fourier transform, a maximum entropy method, a Stockwell transform, a continuous wavelet transform, a matching pursuit transform, an empirical mode decomposition, a Wigner distribution function, and a Synchrosqueezing transform. If the post-stacked seismic image (402) is in the time domain, the spectral section (406) will present temporal frequencies. If the post-stacked seismic image (402) is in the depth domain, the spectral section (406) will present wavenumbers or spatial frequencies. The spectral section (406) presents both frequency content and amplitude content at each location (x, y) (407) within the time-window, $\tau$, within the post-stacked seismic image (402).

In step 508, frequency anomalies (413) are detected by comparing the spectral section (406) to a reference spectral section (410). The reference spectral section (410) may come from the post-stacked seismic image (402) within a time-window, $\tau'$, centered along a known continuous reference horizon (405) that physically represents a boundary (306). A comparison may be performed by comparing the frequency content and amplitude content at one location (x, y) (407) in the spectral section (406) with the frequency content and amplitude content at a reference location (x', y') (411) in the reference spectral section (410). Frequency anomalies (413) may be detected if amplitudes of frequencies at location (x, y) (407) are brighter than amplitudes of frequencies at the reference location (x', y') (411). The number of comparisons should in no way limit the scope of the described invention. Further, the degree to which the amplitude in the frequency-amplitude plot (408) is brighter than the reference amplitude in the reference frequency-amplitude plot (412) for a particular frequency should not limit the scope of the described invention.

In step 510, the location (x, y) (407) of the frequency anomaly (413) is identified as a multiple artifact (114) on the post-stacked seismic image (402). Seismic interpreters may then reinterpret a portion of the horizon (404) or the entire horizon (404) once the multiple artifact (114) is removed or disregarded from the post-stacked seismic image (402).

Figure 6:
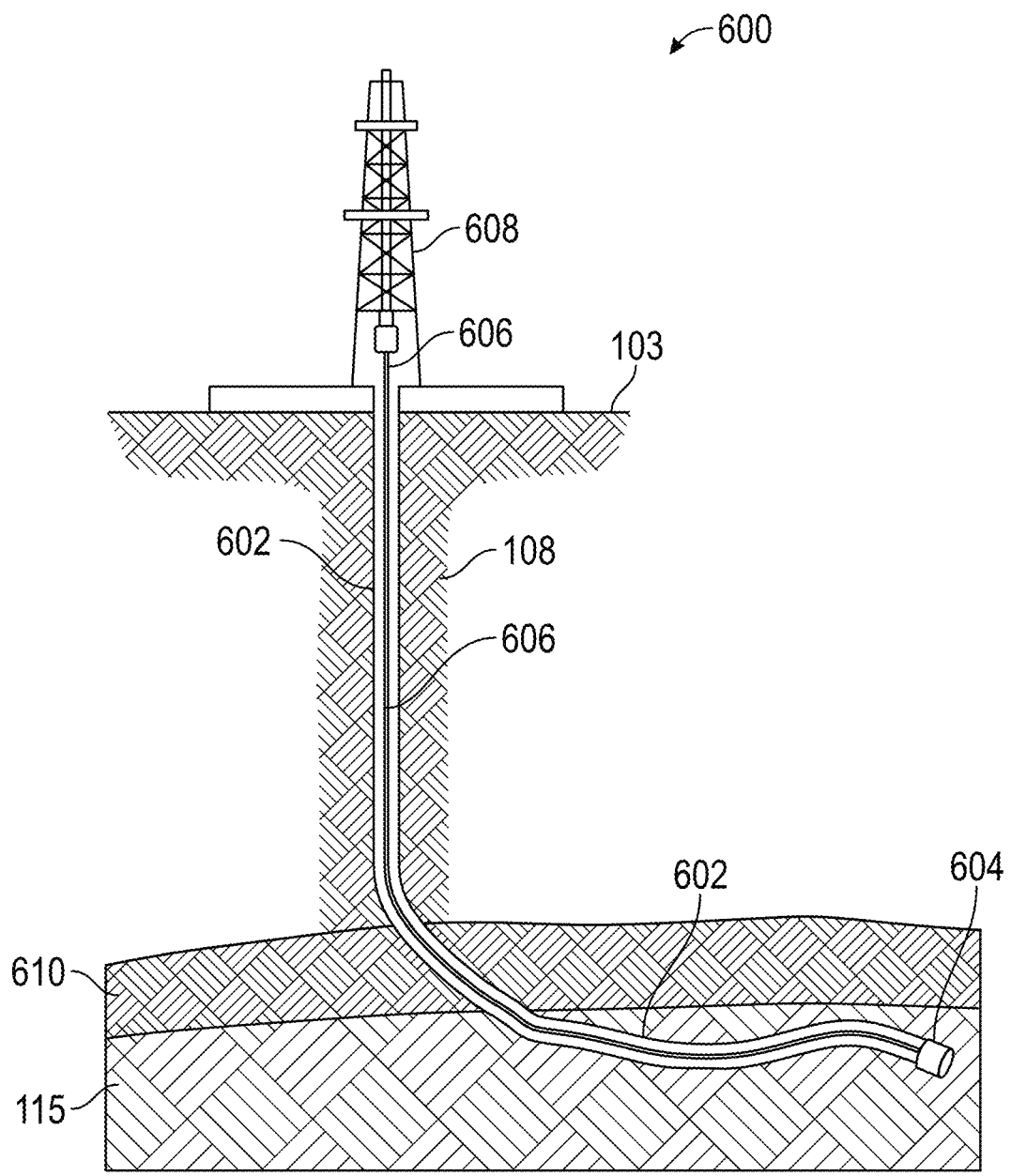
FIG. 6 depicts a drilling system and a wellbore in accordance with one or more embodiments.

FIG. 6 illustrates a drilling system (600). The drilling system (600) includes a drill bit (604) attached to a drillstring (606) that is in turn attached to a drilling rig (608) located on the surface of the Earth (103). The drilling rig (608) may provide rotational motion to the drill bit (604) to drill the wellbore (602) either by rotating the drillstring (606) or by providing pressured drilling mud to a downhole mud motor (not shown). The drilling system (600) may be used to drill a wellbore (602) to access a hydrocarbon reservoir (115). The wellbore (602) may traverse a plurality of rock layers (108) and penetrate one or more boundaries (306) between the surface of the Earth (103) and the hydrocarbon reservoir (115). At least one of the rock layers (108) may form a cap rock (610) to form a seal above the hydrocarbon reservoir (115). The trajectory of the wellbore (602) may be planned based on the post-stacked seismic image (402) and the multiple-artifacts (114) determined by the flowchart (500). The post-stacked seismic image (402) and the multiple-artifacts (114) may be collectively used to minimize the risk of misinterpreting a multiple artifact (114) in the post-stacked seismic image (402) as a primary (101) and erroneously planning and drilling a wellbore (602) that fails to access a productive portion of the hydrocarbon reservoir (115).

Figure 7:
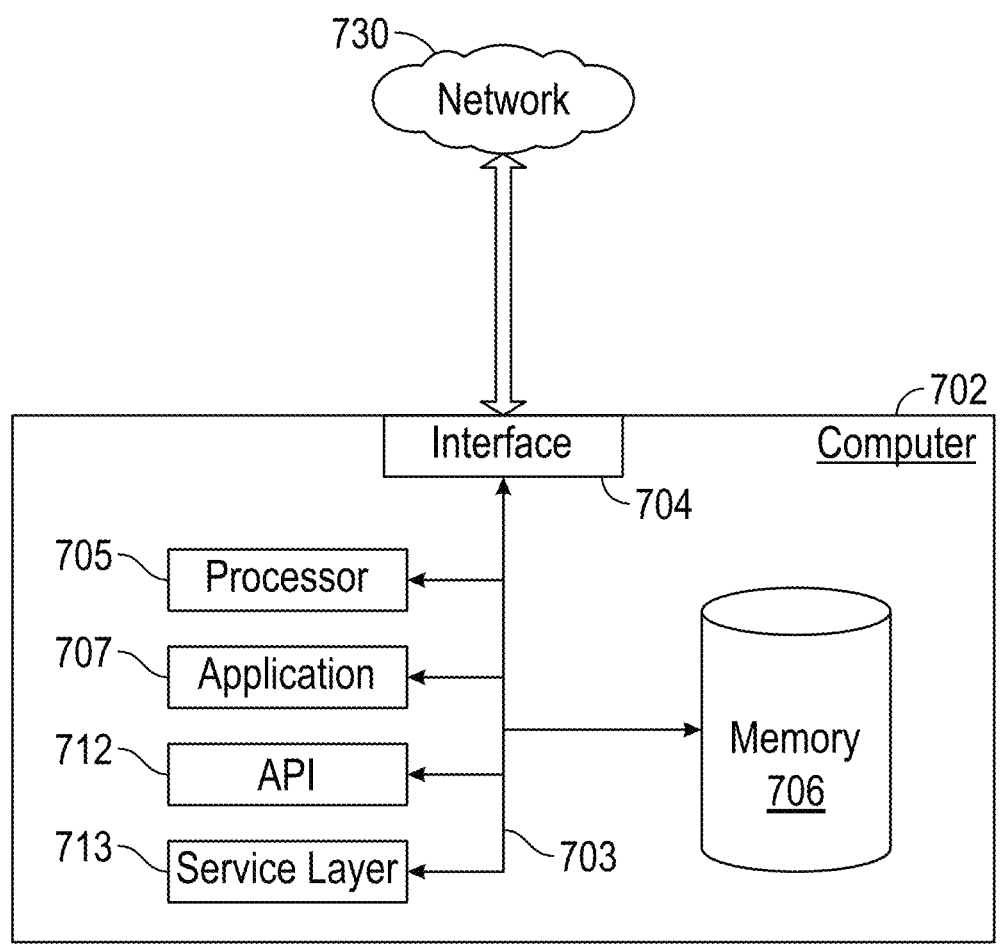
FIG. 7 depicts a computer system in accordance with one or more embodiments.

FIG. 7 depicts a block diagram of a computer system (702) used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (412) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components, such as computer instructions (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702). The memory may be a non-transitory computer readable medium.

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing a computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of identifying a multiple-artifact, comprising:
   obtaining a post-stacked seismic image of a subterranean region;
   identifying a horizon and a reference horizon within the post-stacked seismic image,
      wherein the horizon and the reference horizon are different horizons;
   determining a spectral section over the horizon by applying spectral decomposition within a frequency range to the post-stacked seismic image within the horizon;
   determining a reference spectral section over the reference horizon by applying spectral decomposition within the frequency range to the post-stacked seismic image within the reference horizon;
   detecting a frequency anomaly within the spectral section by comparing the spectral section to the reference spectral section;
   identifying the multiple-artifact based on the frequency anomaly;
   determining a wellbore path based upon the post-stacked seismic image and the multiple-artifact; and
   drilling a wellbore based, at least in part, upon the wellbore path.

2. The method of claim 1, wherein the post-stacked seismic image comprises a post-stacked time migrated seismic image.

3. The method of claim 1, wherein spectral decomposition comprises a short-time Fourier transform.

4. The method of claim 1, wherein a domain of the spectral section and the reference spectral section comprises a temporal frequency.

5. The method of claim 1, wherein the horizon is a portion of the horizon.

6. The method of claim 1, wherein comparing the spectral section to the reference spectral section comprises comparing a first amplitude of the spectral section to a second amplitude of the reference spectral section for each frequency among the frequency range.

7. The method of claim 6, wherein a frequency is the frequency anomaly if the first amplitude exceeds the second amplitude.

8. A system, comprising:
   a seismic acquisition system configured to obtain a post-stacked seismic image of a subterranean region of interest;
   a computer system configured to:
      receive the post-stacked seismic image,
      identify a horizon and a reference horizon within the post-stacked seismic image,
         wherein the horizon and the reference horizon are different horizons,
      determine a spectral section over the horizon by applying spectral decomposition within a frequency range to the post-stacked seismic image within the horizon,
      determine a reference spectral section over the reference horizon by applying spectral decomposition within the frequency range to the post-stacked seismic image within the reference horizon,
      detect a frequency anomaly within the spectral section by comparing the spectral section to the reference spectral section,
      identify a multiple-artifact based on the frequency anomaly, and
      determine a wellbore path based upon the post-stacked seismic image and the multiple-artifact; and a drilling system configured to drill a wellbore based, at least in part, upon the wellbore path.

9. The system of claim 8, wherein the post-stacked seismic image comprises a post-stacked time migrated seismic image.

10. The system of claim 8, wherein spectral decomposition comprises a short-time Fourier transform.

11. The system of claim 8, wherein a domain of the spectral section and the reference spectral section comprises a temporal frequency.

12. The system of claim 8, wherein comparing the spectral section to the reference spectral section comprises comparing a first amplitude of the spectral section to a second amplitude of the reference spectral section for each frequency among the frequency range.

* * * * *